(12) United States Patent
Narvaez Tijerina

(10) Patent No.: US 10,414,482 B2
(45) Date of Patent: Sep. 17, 2019

(54) AIRFOILS FOR STUNT FLIGHTS

(71) Applicant: Juan Gerardo Narvaez Tijerina, Monterrey (MX)

(72) Inventor: Juan Gerardo Narvaez Tijerina, Monterrey (MX)

(*) Notice: Subject to any disclaimer, the term of this patent is extended or adjusted under 35 U.S.C. 154(b) by 211 days.

(21) Appl. No.: 15/504,625

(22) PCT Filed: Aug. 18, 2015

(86) PCT No.: PCT/MX2015/000117
§ 371 (c)(1),
(2) Date: Feb. 16, 2017

(87) PCT Pub. No.: WO2016/028134
PCT Pub. Date: Feb. 25, 2016

(65) Prior Publication Data
US 2017/0233059 A1 Aug. 17, 2017

(30) Foreign Application Priority Data
Aug. 21, 2014 (MX) .................. MX/u/2014/000421

(51) Int. Cl.
*B64C 3/14* (2006.01)
(52) U.S. Cl.
CPC .................. *B64C 3/14* (2013.01); *Y02T 50/12* (2013.01)
(58) Field of Classification Search
CPC ...................................................... B64C 3/14
See application file for complete search history.

(56) References Cited

U.S. PATENT DOCUMENTS

| | | | | |
|---|---|---|---|---|
| 1,547,644 A | * | 7/1925 | Cronstedt | B64C 3/14 244/35 R |
| 2,257,260 A | * | 9/1941 | Kartvelichvili | B64C 3/14 244/35 R |
| 3,952,971 A | * | 4/1976 | Whitcomb | B64C 3/14 244/35 R |
| 4,240,598 A | * | 12/1980 | Vinas Espin | B64C 3/14 244/35 R |
| 4,412,664 A | * | 11/1983 | Noonan | B64C 27/467 244/35 A |
| 4,413,796 A | * | 11/1983 | Bousquet | B64C 3/14 244/35 R |

(Continued)

*Primary Examiner* — Philip J Bonzell
*Assistant Examiner* — Michael B. Kreiner
(74) *Attorney, Agent, or Firm* — Brandon T. Cook; Gunn, Lee & Cave, P.C.

(57) ABSTRACT

The invention relates to airfoils, called jn1431-265 and 1413-362, which operate intelligently by adjusting the variable aerodynamics thereof, not only through the attack and sine angle, but also through the effect of scale (air speed), which, when combined, improve the efficiency of the wings configured therewith by up to 30%, cause the wings to experience a predictable stall and also rapidly recover therefrom, and also making the wings configured therewith more efficient at low speed, which reduces the need to use flaps or slats ("high lift devices"), and, in the event that flaps or slats are used, increase the effect of said airfoils even more. On the other hand, at an increased speed, the aerodynamic variables also adjust by up to a third of the value thereof (the angle of attack remaining unchanged), causing the wing to also be very stable at high speed conditions.

2 Claims, 6 Drawing Sheets

(56) References Cited

U.S. PATENT DOCUMENTS

| | | | | |
|---|---|---|---|---|
| 4,524,928 A * | 6/1985 | Schmidt | ............... | B64C 3/14 |
| | | | | 244/35 R |
| 5,957,662 A * | 9/1999 | Aoki | ............... | B64C 3/14 |
| | | | | 416/223 R |
| 6,651,927 B1 * | 11/2003 | Hackett | ............... | B64C 3/14 |
| | | | | 244/35 R |
| 7,854,593 B2 * | 12/2010 | Owen | ............... | B64C 3/14 |
| | | | | 244/35 R |
| 9,208,689 B2 * | 12/2015 | Fisher | ............... | B64C 39/024 |
| 10,137,976 B2 * | 11/2018 | Klein | ............... | F04D 29/384 |
| 2002/0005458 A1 * | 1/2002 | Carter, Jr. | ............... | B64C 3/14 |
| | | | | 244/35 R |

* cited by examiner

AIRFOILS FOR STUNT FLIGHTS

PURPOSE OF INVENTION

The purpose is to improve the airfoils' performance for the construction of wings both in their low-speed performance (takeoff and landing) and their stability at high speeds with an acceptable capacity for inverted flight (acrobatic capacity).

BACKGROUND

It is well established in the field of aviation and aeronautics that airfoils are developed in accordance with specific purposes of flight (of speed, for gliding, acrobatic, etc.). The objective when designing these airfoils is to have airfoils with an improved flight capacity both at low and at high speeds, and with the capacity for inverted flight. There might be in the state of the technique documents such as the U.S. Pat. No. 6,607,164 B2, which presents an airfoil having particular use in a general aviation aircraft operating at generally low speeds. Said airfoil has a shape designed to produce high lift coefficients at low speeds and low drag and lower lift coefficients at higher speeds. Said airfoil's characteristics are not sensitive to surface roughness on the leading edge caused by the accumulation of foreign matter on the airfoil due to the transition to turbulent flow occurring near the leading edge at high lift coefficients, therefore limiting effective use of the airfoils disclosed in the '164 patent to low speeds. In contrast, the airfoils and wings disclosed herein are intended to be used at low speed and high speed, and have capacity for inverted (aerobatic) flight.

DETAILED DESCRIPTION OF THE INVENTION

Figure 1:
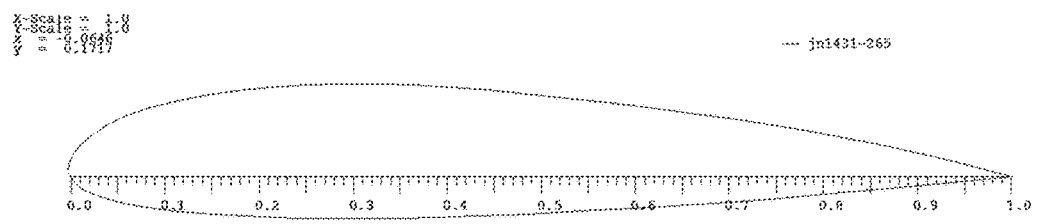
FIG. 1 is a view of airfoil jn1431-265 which will be used for the wing root because it has the lowest lift coefficient and allows for the most stable stall.
Figure 2:
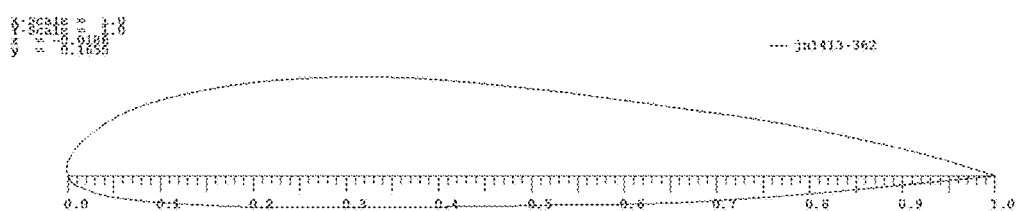
FIG. 2 is a view of airfoil jn1413-362 which will be used for configuring the wing's end and this way make up the combination with the wing root's airfoil jn1431-265 in order to allow for the aforementioned characteristics of the wing's performance.

Airfoils jn1432-265 and jn1413-362, as shown in FIGS. 1 and 2, were designed to be used in the construction of general aviation wings. During the initial phase the design of the upper and lower curves of each airfoil were worked on in order to obtain the highest possible lift coefficient (cl) from is each airfoil section without increasing the camber too much to prevent sacrificing inverted flight, the lift coefficient (cl) differential was also considered between airfoil jn1432-265 and airfoil jn1413-365 in order to have a more predictable stall.

When analyzing the scale effect we found that the different curves when going through angles between 0 and +1 (taking into account that the angle of incidence in which the wing normally flies is within this range) of the graphs, the lift coefficient is highest when the Reynolds number is lowest and decreases as the Reynolds number increases. As the Reynolds number increases the coefficient adjusts to each flight condition, therefore the coefficient is high at slow speeds allowing for short, predictable and safer takeoffs and landings. The coefficient decreases as the speed increases which creates stability by allowing for more flexibility in different flight conditions. It has also been observed that UAVs configured with these wings for testing have a better performance in conditions with increased winds as compared to aircraft that have been configured with other airfoils. Also, the drag coefficient (cd) which in itself is low in the highest values of the lift coefficient (cl) also descends to values up to one third of the initial value as the Reynolds number increases.

The following table contains the coordinates of airfoil jn1431-265 which will be used for the wing root because it has the lowest lift coefficient and allows for the most stable stall.

| jn1431-265 | |
|---|---|
| x/c | y/c |
| 1.00000 | 0.00000 |
| 0.93208 | 0.01735 |
| 0.86931 | 0.03162 |
| 0.81110 | 0.04326 |
| 0.75688 | 0.05274 |
| 0.70609 | 0.06050 |
| 0.65816 | 0.06700 |
| 0.61252 | 0.07269 |
| 0.56862 | 0.07799 |
| 0.52612 | 0.08296 |
| 0.48480 | 0.08744 |
| 0.44444 | 0.09132 |
| 0.40479 | 0.09445 |
| 0.36565 | 0.09669 |
| 0.32678 | 0.09790 |
| 0.28797 | 0.09796 |
| 0.24942 | 0.9678 |
| 0.21171 | 0.09436 |
| 0.17546 | 0.09069 |
| 0.14128 | 0.08574 |
| 0.10977 | 0.07951 |
| 0.08155 | 0.07198 |
| 0.05722 | 0.06316 |
| 0.03716 | 0.05320 |
| 0.02128 | 0.04262 |
| 0.00946 | 0.03199 |
| 0.00155 | 0.02185 |
| −0.00257 | 0.01277 |
| −0.00305 | 0.00530 |
| 0.00000 | 0.00000 |
| 0.00093 | −0.00350 |
| 0.00392 | −0.00748 |
| 0.00929 | −0.01180 |
| 0.01735 | −0.01630 |
| 0.02843 | −0.02084 |
| 0.04284 | −0.02526 |
| 0.06090 | −0.02941 |
| 0.08287 | −0.03316 |
| 0.10851 | −0.03643 |
| 0.13736 | −0.03922 |
| 0.16892 | −0.04150 |
| 0.20271 | −0.04325 |

-continued jn1431-265

| x/c | y/c |
| --- | --- |
| 0.23825 | −0.04445 |
| 0.27506 | −0.04508 |
| 0.31266 | −0.04513 |
| 0.35071 | −0.04463 |
| 0.38901 | −0.04368 |
| 0.42735 | −0.04235 |
| 0.46555 | −0.04074 |
| 0.50340 | −0.03894 |
| 0.54070 | −0.03704 |
| 0.57728 | −0.03513 |
| 0.61394 | −0.03316 |
| 0.65348 | −0.03078 |
| 0.69893 | −0.02764 |
| 0.75328 | −0.02336 |
| 0.81957 | −0.01757 |
| 0.90080 | −0.00990 |
| 1.00000 | 0.00000 |

The following table contains the coordinates of airfoil JN1413-362 which will be used for the wing end.

| x/c | y/c |
| --- | --- |
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |
| 0.0121 | 0.0325 |
| 0.0042 | 0.0221 |
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |

| x/c | y/c |
| --- | --- |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000 |

Airfoil jn1431-265 as the wing root combined with airfoil jn1413-362 as the wing end create the aforementioned characteristics of wing performance.

Figure 3:
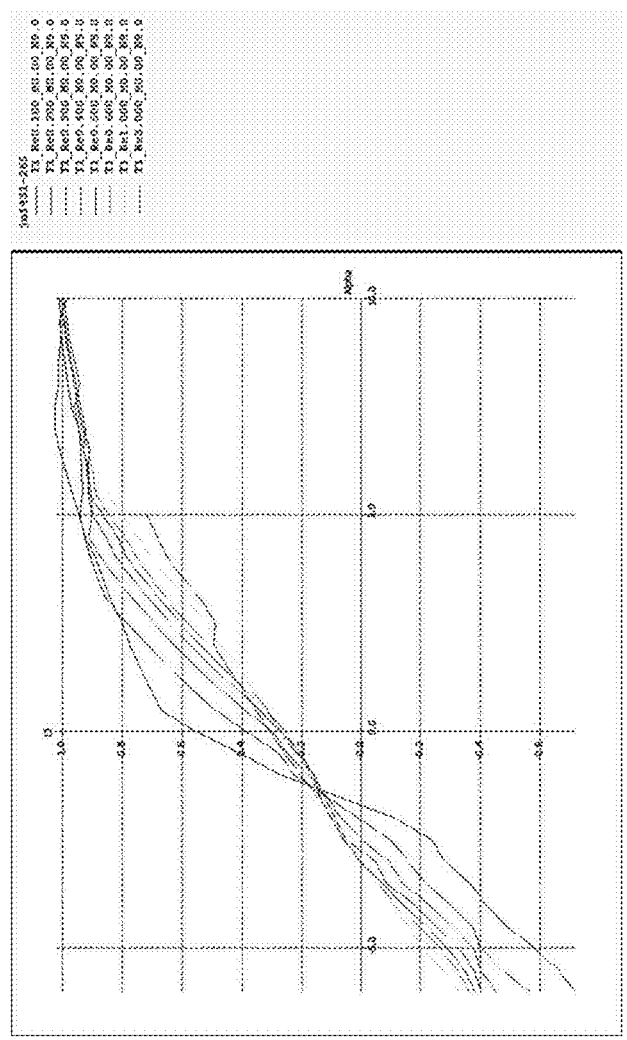
FIG. 3 shows the lift coefficient (cl) at different angles of attack (alpha) and using different scale effects (re) of airfoil jn1431-265.
Figure 4:
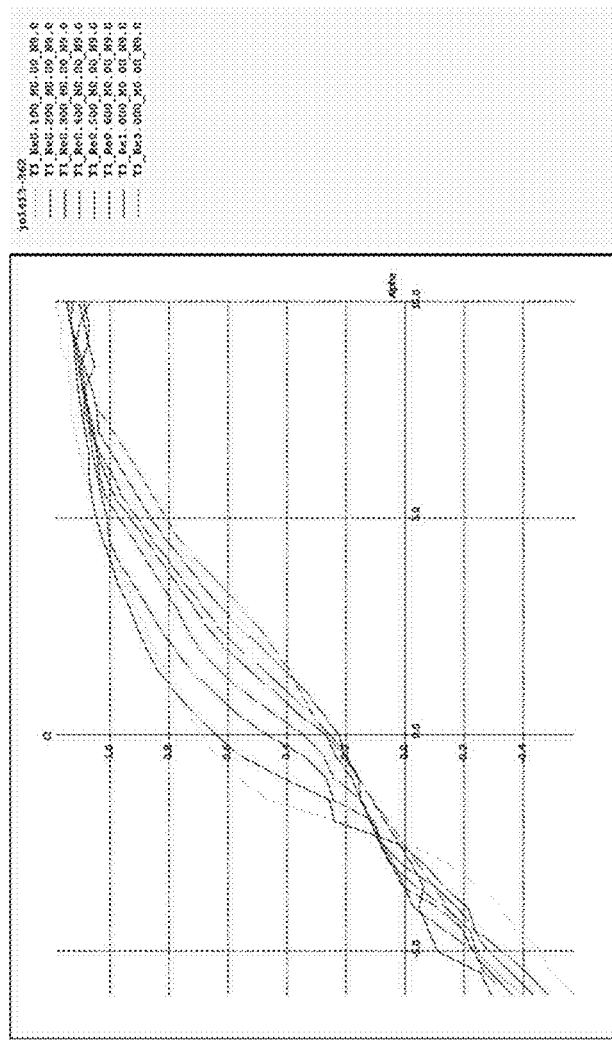
FIG. 4 shows the lift coefficient (cl) at different angles of attack (alpha) and using different scale effects (re) of airfoil jn1413-362.

Airfoil jn1431-265 is 14.31% wide in relation to its length and airfoil jn1413-362 is 14.13% wide in relation to its length. Airfoil jn1431-265 has a camber of 2.65 and airfoil jn1413-362 has a camber of 3.62. Airfoils jn1431-265 and 1413-362 operate intelligently by adjusting their variable aerodynamics, not only by the angle of attack, but also by the scale effect (speed), as shown in FIGS. 3 and 4. When combined, these airfoils improve the efficiency of the wings configured therewith by up to 30%. They also cause the wing to experience a predictable stall as well as a quick recovery therefrom. Additionally, they are more efficient at low speed, reducing the need to use flaps or slats ("high lift devices).

Figure 5:
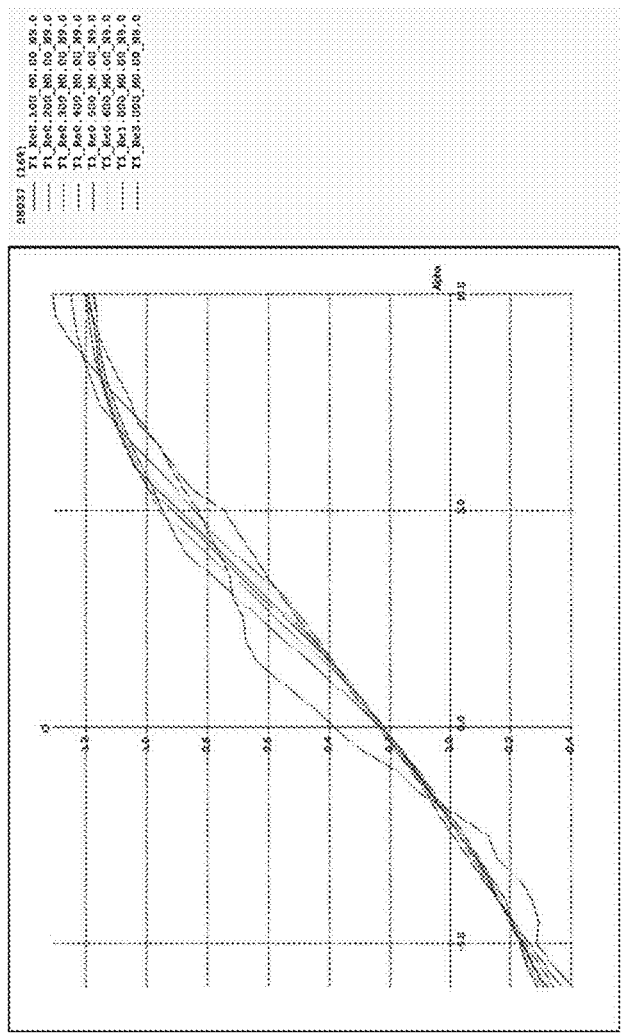
FIG. 5 shows the lift coefficient (cl) at different angles of attack (alpha) and using different scale effects (re) of Dr. Seilig's airfoil s8037 which is included for comparison purposes.

FIG. 5 shows the lift coefficient (cl) at different angles of attack (alpha) and using different scale effects (re) of Dr. Seilig's airfoil s8037 which is included for comparison purposes. On the other hand, as the speed increases the aerodynamic variables adjust by up to a third of the value thereof (with the same angle of attack), causing the wing to also be very stable at this high-speed condition.

Figure 6:
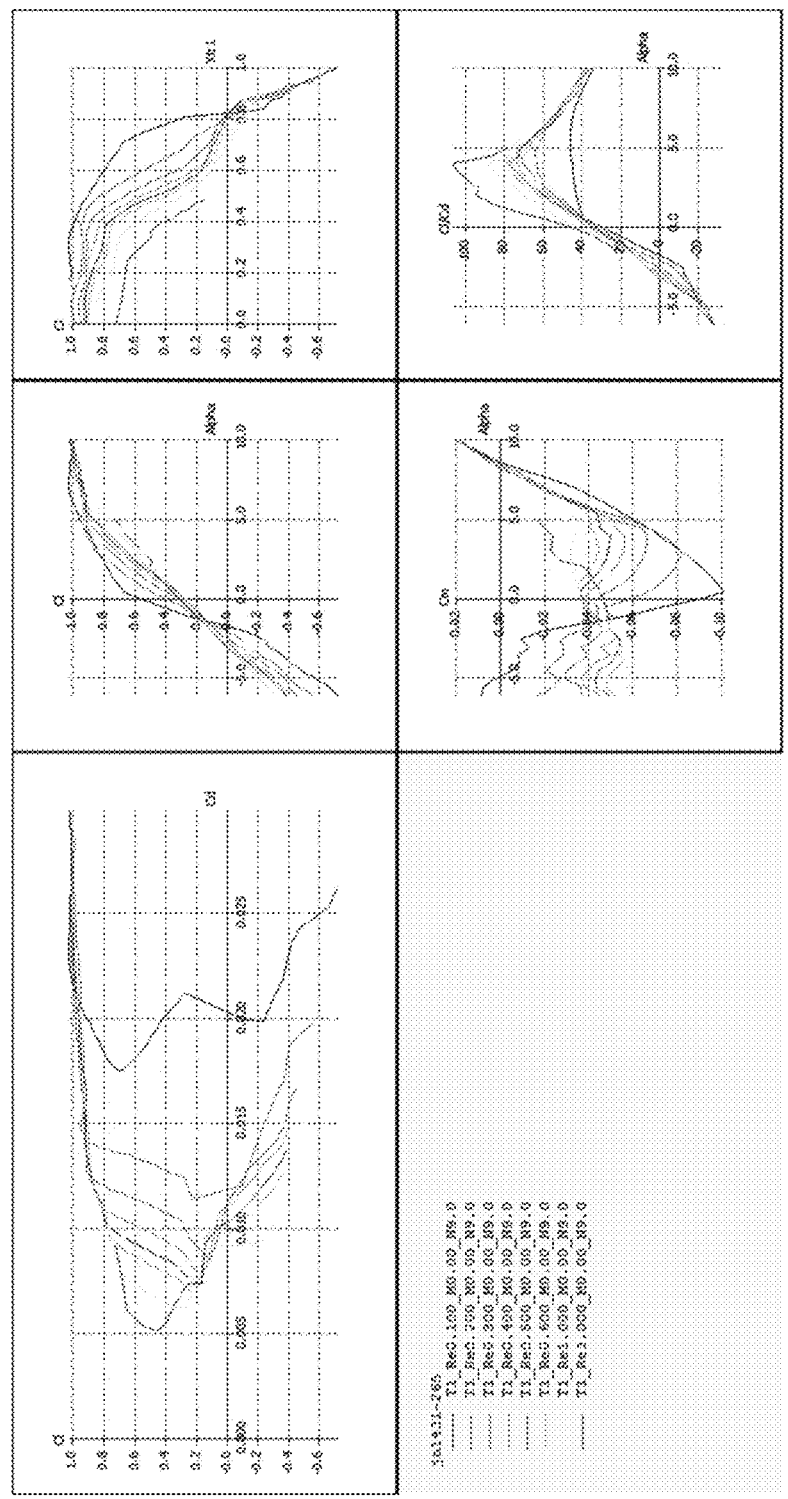
FIG. 6 shows the different polar graphs for airfoil jn1431-265.
Figure 7:
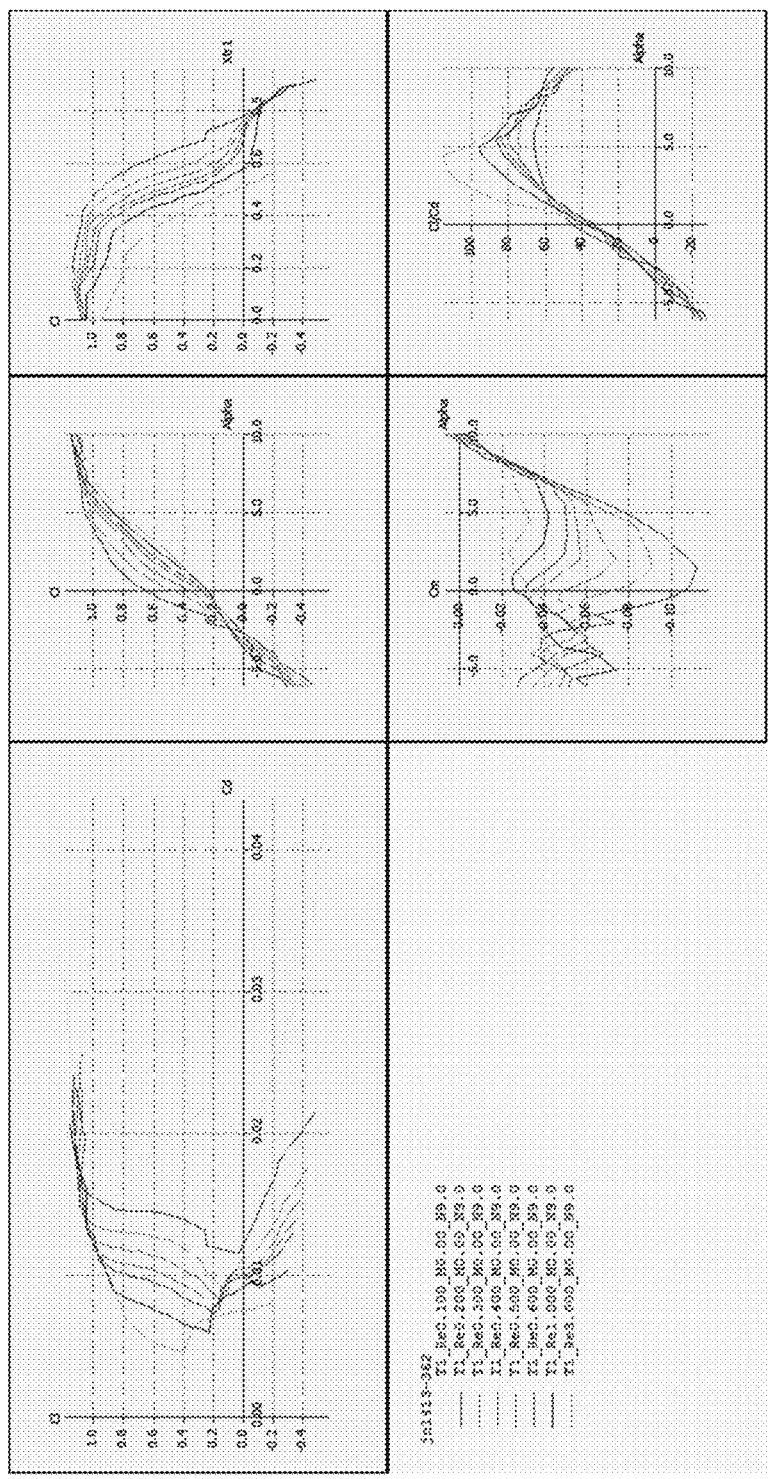
FIG. 7 shows the different polar graphs for airfoil jn1413-362.

FIGS. 6 and 7 show the different polar graphics for airfoils jn1431-265 and jn1413-362, respectively.

Having sufficiently described by invention, I believe it to be an innovation and therefore I claim the contents in the following clauses to be my own exclusive property:

1. A wing for an aircraft, comprising:
    a wing root attached to the aircraft and a wing end distal to the wing root, the wing root having an airfoil shape extending from a leading edge to a trailing edge;
    wherein the airfoil shape has a chord length c extending along an x-axis in the chordwise direction, such that x=0 corresponds to the position of the leading edge and x=c correspondents to the position of the trialing edge, the airfoil shape being furthermore defined by a y-axis extending in the thickness direction;
    wherein the airfoil shape is characterized by the coordinate pairs x/c, y/c given by the following table:

| x/c | y/c |
| --- | --- |
| 1.00000 | 0.00000 |
| 0.93208 | 0.01735 |
| 0.86931 | 0.03162 |
| 0.81110 | 0.04326 |
| 0.75688 | 0.05274 |
| 0.70609 | 0.06050 |
| 0.65816 | 0.06700 |
| 0.61252 | 0.07269 |
| 056862 | 0.07799 |
| 0.52612 | 0.08296 |
| 0.48480 | 0.08744 |
| 0.44444 | 0.09132 |
| 0.40479 | 0.09445 |

| x/c | y/c |
| --- | --- |
| 036565 | 0.09669 |
| 0.32678 | 0.09790 |
| 0.28797 | 0.09796 |
| 0.24942 | 0.09678 |
| 0.21171 | 0.09436 |
| 0.17546 | 0.09069 |
| 0.14128 | 0.08574 |
| 0.10977 | 0.07951 |
| 0.08155 | 0.07198 |
| 0.05722 | 0.06316 |
| 0.03716 | 0.05320 |
| 0.02128 | 0.04262 |
| 0.00946 | 0.03199 |
| 0.00155 | 0.02185 |
| −0.00257 | 0.01277 |
| −0.00305 | 0.00530 |
| 0.00000 | 0.00000 |
| 0.00093 | −0.00350 |
| 0.00392 | −0.00748 |
| 0.00929 | −0.01180 |
| 0.01735 | −0.01630 |
| 0.02843 | −0.02084 |
| 0.04284 | −0.02526 |
| 0.6090 | −0.02941 |
| 0.08287 | −0.03316 |
| 0.10851 | −0.03643 |
| 0.13736 | −0.03922 |
| 0.16892 | −0.04150 |
| 0.20271 | −0.04325 |
| 0.23825 | −0.04445 |
| 0.27506 | −0.04508 |
| 0.31266 | −0.04513 |
| 0.35071 | −0.04463 |
| 0.38901 | −0.04368 |
| 0.42735 | −0.04235 |
| 0.46555 | −0.04074 |
| 0.50340 | −0.03894 |
| 0.54070 | −0.03704 |
| 0.57728 | −0.03513 |
| 0.61394 | −0.03316 |
| 0.65348 | −0.03078 |
| 0.69893 | −0.02764 |
| 0.75328 | −0.02336 |
| 0.81957 | −0.01757 |
| 0.90080 | −0.00990 |
| 1.00000 | 0.00000 |

2. A wing for an aircraft, comprising:

A wing root attached to the aircraft and a wing end distal to the wing root, the wing end having an airfoil shape extending from a leading edge to a trialing edge;

wherein the airfoil shape has a chord length c extending along an x-axis in the chordwise direction, such that x=0 corresponds to the position of the leading edge and x=c correspondents to the position of the trailing edge, the airfoil shape being furthermore defined by a y-axis extending in the thickness direction;

wherein the airfoil shape is characterized by the coordinate pairs x/c, y/c given by the following table:

| x/c | y/c |
| --- | --- |
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |
| 0.0121 | 0.0325 |
| 0.0042 | 0.0221 |
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000 |

* * * * *